(12) United States Patent
Sodore

(10) Patent No.: US 10,259,585 B2
(45) Date of Patent: Apr. 16, 2019

(54) AIRCRAFT SEAT FITTING

(71) Applicant: Bishop GMBH, Hamburg (DE)

(72) Inventor: Oumarou Sodore, Hamburg (DE)

(73) Assignee: Bishop GmbH, Hamburg (DE)

( * ) Notice: Subject to any disclaimer, the term of this patent is extended or adjusted under 35 U.S.C. 154(b) by 163 days.

(21) Appl. No.: 15/112,822

(22) PCT Filed: Sep. 30, 2014

(86) PCT No.: PCT/EP2014/070919
§ 371 (c)(1),
(2) Date: Jul. 20, 2016

(87) PCT Pub. No.: WO2015/110186
PCT Pub. Date: Jul. 30, 2015

(65) Prior Publication Data
US 2016/0332735 A1 Nov. 17, 2016

(30) Foreign Application Priority Data

Jan. 23, 2014 (DE) .......................... 10 2014 201 176

(51) Int. Cl.
*B60N 2/015* (2006.01)
*B64D 11/06* (2006.01)
(52) U.S. Cl.
CPC ................. *B64D 11/0696* (2013.01)
(58) Field of Classification Search
USPC ...... 248/424, 429, 503, 503.1, 224.8, 188.1, 248/188.2, 188.4, 188.8; 297/344.1,
(Continued)

(56) References Cited

U.S. PATENT DOCUMENTS 3,677,195 A 7/1972 Prete, Jr.
4,230,432 A * 10/1980 Howell ................. B60P 7/0815
248/503.1
(Continued)

FOREIGN PATENT DOCUMENTS

DE 102005033048 1/2007
DE 102006045392 3/2007
(Continued)

OTHER PUBLICATIONS

Search Report.

*Primary Examiner* — Terrell L McKinnon
*Assistant Examiner* — Michael McDuffie
(74) *Attorney, Agent, or Firm* — Alix, Yale & Ristas, LLP

(57) ABSTRACT

A seat fitting connects an aircraft seat to a floor rail of an aircraft. The seat fitting comprises a vertically oriented pin, a web connected to the pin and a first holding body which projects in the lateral direction with respect to the web. The holding body is configured in order to engage behind a lip of the floor rail. The seat fitting further comprises a tensioning element in order to tension the holding body in the vertical direction against the lip of the floor rail. The seat fitting comprises a second holding body projecting in the lateral direction and having a spacing of an inch from the first holding body in the longitudinal direction, and that the pin is arranged with an offset in the longitudinal direction relative to the first holding body and the second holding body.

20 Claims, 4 Drawing Sheets

(58) Field of Classification Search
USPC .......................................... 297/344.11, 463.1
See application file for complete search history.

(56) References Cited

U.S. PATENT DOCUMENTS

| | | | |
|---|---|---|---|
| 5,090,639 A | 2/1992 | Miller et al. | |
| 5,520,357 A * | 5/1996 | Payne | B61D 45/006 244/118.1 |
| 7,607,736 B2 * | 10/2009 | Ponzo De Siqueira | B64D 11/0696 244/118.1 |
| 7,661,637 B2 * | 2/2010 | Mejuhas | B64D 11/0696 248/157 |
| 7,861,996 B2 * | 1/2011 | Ponzo De Siqueira | B64D 11/0696 244/118.6 |
| 7,975,979 B2 * | 7/2011 | Bishop | B60P 7/0815 244/118.6 |
| 8,182,183 B2 * | 5/2012 | Cook | B60N 2/01558 244/118.1 |
| 8,845,249 B2 * | 9/2014 | Rowles | B60P 7/0815 410/105 |
| 8,899,545 B2 * | 12/2014 | Blees | B64D 9/00 244/118.1 |
| 2007/0063122 A1 * | 3/2007 | Bowd | B64C 1/20 248/429 |
| 2009/0321606 A1 * | 12/2009 | Wilhelm | B60N 2/01575 248/503 |
| 2011/0309214 A1 | 12/2011 | Blees et al. | |
| 2012/0181409 A1 * | 7/2012 | Hayahara | B60N 2/01575 248/429 |
| 2012/0210372 A1 * | 8/2012 | Kaufmann | B64C 1/20 725/77 |
| 2015/0041608 A1 * | 2/2015 | Sawdy | B60N 2/0722 248/429 |
| 2016/0075434 A1 * | 3/2016 | Siegmeth | B60P 7/0815 297/344.1 |

FOREIGN PATENT DOCUMENTS

| | | |
|---|---|---|
| DE | 102011013688 | 9/2011 |
| EP | 2206623 | 7/2010 |

* cited by examiner

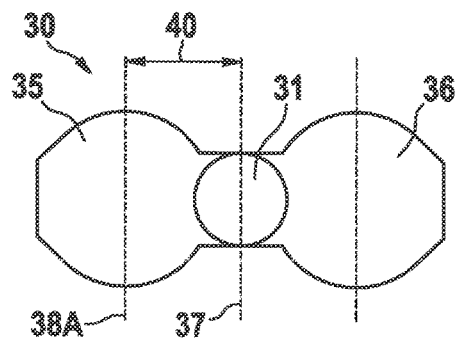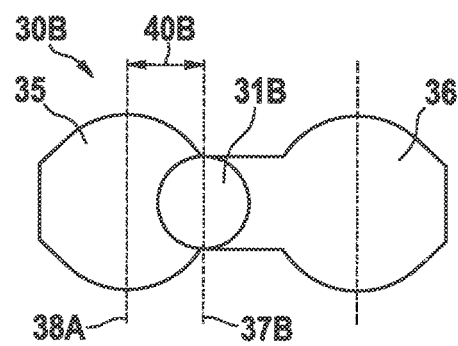
Fig. 5A    Fig. 5B
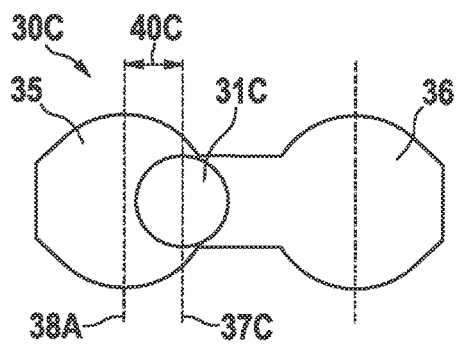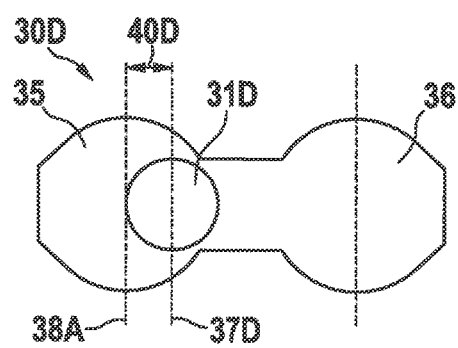
Fig. 5C    Fig. 5D
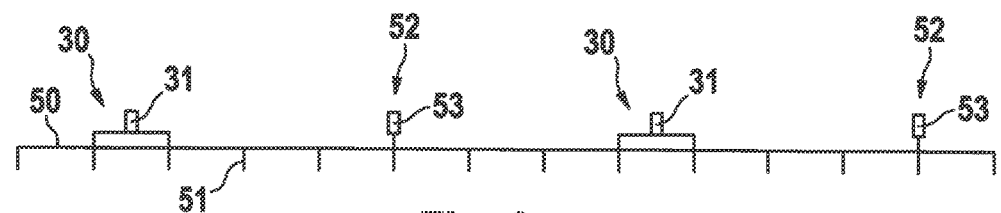
Fig. 6
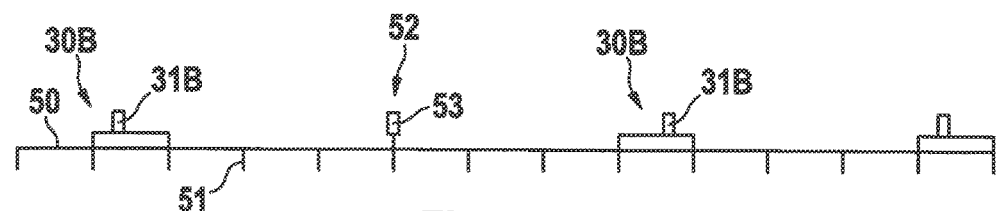
Fig. 7

AIRCRAFT SEAT FITTING

BACKGROUND

The invention relates to a seat fitting for connecting an aircraft seat to a floor rail of an aircraft. The seat fitting comprises a vertically oriented pin, a web connected to the pin and a first holding body which projects in the lateral direction with respect to the web and which is configured in order to engage behind a lip of the floor rail. The seat fitting furthermore comprises a tensioning element in order to tension the holding body in the vertical direction against the lip of the floor rail.

Such seat fittings are used to attach aircraft seats in the passenger compartment of an aircraft to a floor rail. Standardized floor rails are normally used in passenger aircraft. Such floor rails comprise a track running in the longitudinal direction with a floor surface which is bordered in the transverse direction by lateral surfaces. An inwardly pointing lip which is provided at spacings of in each case 1 inch with recesses for the holding bodies is arranged at the upper end of the lateral surfaces. The holding body of the seat fitting can be introduced between the lips from above into the track through the recesses. After introduction of a tensioning element through the recesses, the seat fitting can be displaced in the longitudinal direction into a fixing position. In this position, the holding body is located below the lips located between the recesses. The holding body can then be tensioned with the aid of the tensioning element in the vertical direction against the lips.

In the case of known seat fittings, the pin is arranged with an offset of zero inches with respect to the holding body, as directly above the holding body. Since the seat fittings can only be connected to the floor rail in a limited number of discrete positions, the longitudinal position of the pin relative to the floor rail can also not be selected as desired. As a result, the longitudinal position of an aircraft seat attached to the pin can also only be selected up to a precision of one inch.

SUMMARY

A seat fitting in combination with known seat fittings allows a more flexible setting of the longitudinal position of aircraft seats.

The seat fitting has a second holding body projecting in the lateral direction and having a spacing of an inch from the first holding body in the longitudinal direction, and the pin is arranged with an offset in the longitudinal direction relative to the first holding body and the second holding body.

A number of terms used in the context of the invention will now be described. A floor rail refers in the context of the invention to a standardized attachment rail for aircraft seats which is normally attached to the floor surface of a cabin of a passenger aircraft.

The longitudinal direction of the seat fitting refers in the context of the invention to the direction which is directed from one lateral holding body to the other lateral holding body. If the seat fitting is connected to the floor rail according to specification, the longitudinal direction of the seat fitting corresponds to the longitudinal direction of the floor rail. The spacing between two adjacent recesses of the lip in the longitudinal direction is 1 inch. As is known, this corresponds to 1 inch and 2.54 cm.

The vertical direction and the transverse direction of the seat fitting are oriented perpendicular to one another and in each case perpendicular to the longitudinal direction. If the seat fitting is placed on a floor rail according to specification, the vertical direction runs perpendicular to the floor surface of the cabin and the transverse direction parallel to the floor surface. The indications longitudinal direction, transverse direction and vertical direction as well as direction indications derived therefrom relate to the arrangement of components of the seat fitting relative to one another. They do not say anything about the arrangement of the seat fitting in the space.

The web refers to the portion of the seat fitting which is arranged between the lips if the seat fitting is connected to the floor rail. It is not necessary for the web to be structurally delimited from the pin. On the contrary, the pin can be formed by a simple elongation of the pin.

The tensioning element can be, for example, a thread which is arranged on the outer side of the pin. The seat fitting can be tensioned via the tensioning element in the vertical direction against the lip of the floor rail with a suitable counter-element, in this example, a nut which matches the thread.

If the pin is arranged with an offset in the longitudinal direction with respect to the lateral holding bodies, this means that the longitudinal position of the pin is arranged between the longitudinal positions of the lateral holding bodies. The offset refers in this case to the spacing in the longitudinal direction between the pin and a lateral holding body. Were the pin to be arranged above the first holding body, this would correspond to an offset of 0 inches. Were the pin to be arranged above the second holding body, this would correspond to an offset of 1 inch. Neither would be according to the invention. In the case of the seat fitting according to the invention, the offset is greater than 0 inches and less than 1 inch.

The seat fitting serves to connect a front leg of an aircraft seat to the floor rail. If the aircraft seat has a multiplicity of front legs, a corresponding multiplicity of seat fittings is necessary. Further seat fittings may be required to connect the rear legs of the aircraft seat to the floor rail.

With the aid of the seat fitting, it is possible to arrange an aircraft seat in an intermediate position between two positions spaced apart as standard. By combination with standard seat fittings (offset 0 inches) or with seat fittings with a different offset, a multiplicity of aircraft seats can be distributed significantly more flexibly in an aircraft. As a result of the offset between the holding body and the pin of the seat fitting, it is possible to adjust the spacing of an aircraft seat to an adjacent aircraft seat in the longitudinal direction with increased precision below the 1 inch spacings specified by the floor rail. It is furthermore possible to adjust the spacing between an aircraft seat and a wall which lies in front of or behind it in the longitudinal direction with increased precision. In this manner, for example, the spacing between a backrest of an aircraft seat and a wall lying behind it can be reduced in order to reduce undesirable gaps between the backrest and the wall. A passenger can be given more leg room in this manner.

The contour surface of the holding body as seen in the vertical direction is preferably adapted to the surface of the recesses of the floor rail. The holding body can then be introduced in the vertical direction through the recesses and also has a maximum tensioning surface which can be clamped between the tensioning element and the lips of the floor rail. The fixing of the seat fitting to the floor rail is particularly reliable in this manner. The holding body can have in each case a first lateral holding projection and a second lateral holding projection which project in opposite directions with respect to the web so that the outer contours of the first holding projection and of the second holding projection lie on an imaginary circular line. The diameter of the web in the transverse direction can lie between 40% and 60% of the diameter of the holding body.

The holding body can be formed, for example, by two lateral projections which project in opposite directions to the outside at a longitudinal position of the seat fitting. The contour of the projections is preferably adapted to the surface of the recesses of the floor rail.

The subject matter is also a set of seat fittings. A set of seat fittings refers to a multiplicity of seat fittings which are intended to be arranged behind one another on a single floor rail at different longitudinal positions. Each seat fitting is designed to connect a different aircraft seat to the floor rail. If each aircraft seat is connected to a multiplicity of floor rails, a corresponding multiplicity of sets is required for complete attachment of the aircraft seat.

One embodiment of a set of seat fittings comprises a seat fitting pair with two seat fittings, in the case of which the pin has an offset greater than 0 inches and less than 0.5 inches. A seat fitting pair refers to two seat fittings which have an identical offset. By virtue of the fact that these seat fittings are attached with opposite orientation on the floor rail, it becomes possible to use two different intermediate positions between the standard positions with one set of two identical seat fittings.

Particularly in the case of an offset of 0.25 inches it becomes possible to adjust the spacing of seats arranged behind one another in 0.5 inch steps and thereby maintain an equidistant arrangement of the seats. Equidistant arrangement means that two aircraft seats adjacent to one another in the longitudinal direction have in each case the same spacing to one another. The number of equidistantly arranged aircraft seats is only restricted by the length of the floor rail. A corresponding equidistant arrangement with a graduation of 0.5 inches can be achieved if the set comprises a standard seat fitting with an offset of 0 inches and a seat fitting with an offset of 0.5 inches. By adding a seat fitting pair with an offset of 0.25 inches, the graduation can be reduced to 0.25 inches.

In a different embodiment, the offset of the two seat fittings of the seat fitting pair is 1/n inches, where n is an integer greater than 2. An equidistant arrangement with a graduation of less than 0.5 inches then becomes possible, on the condition that further seat fittings with a different offset are added. It can in particular be advantageous to add a standard seat fitting with an offset of 0 inches.

A front leg of an aircraft seat can in each case be attached to the pin. The set can be supplemented by further seat fittings in order to attach, for example, a second front leg and the two back legs of the aircraft seat to the floor rail. In this manner, it is in particular possible to arrange two aircraft seats at a spacing to one another which deviates by 0.5 inches from an integer multiple of an inch. The set and the arrangement can be extended in order to arrange further aircraft seats in the longitudinal direction in front of or behind the above-mentioned aircraft seats.

The subject matter is furthermore a further set of seat fittings, comprising a standard seat fitting with an offset of 0 inches. The set also comprises two seat fittings, wherein the pin is arranged with a ⅓ inch offset in the longitudinal direction with respect to the lateral holding bodies. This enables an equidistant arrangement of aircraft seats with a ⅓ inch graduation of the spacings. Such a set of seat fittings namely makes it possible to arrange three seat fittings on a seat rail, wherein the pins of the seat fittings have a spacing which deviates by ⅓ inch from a multiple of one inch. Such an arrangement is also the subject matter of the present disclosure. Since a seat fitting can also be inserted into the floor rail after a rotation about a vertical axis about 180°, a seat fitting with a ⅓ inch offset simultaneously represents a seat fitting with a ⅔ inch offset. A set as a result requires significantly fewer different elements, as a result of which production and storage costs can be saved and the logistical outlay in fitting an aircraft with seat fittings is reduced.

In an analogous manner, the concept of the invention can also be extended to sets of seat fittings with which aircraft seats can be arranged at a spacing to one another, which deviates by ¼ inch, ⅕ inch or ⅙ inch from an integer multiple of one inch. In the case of the ¼ inch sets, the ½ inch set can be used since a 2/4 inch offset corresponds to a ½ inch offset. A seat fitting with a ¼ inch offset can furthermore be used as a fitting with ¾ inch offset by rotation by 180° about a vertical axis. In an analogous manner, the set with ⅓ inch offset can be used in the case of a set with ⅙ inch offset. The number of different seat fittings required is limited as a result of this.

The invention furthermore relates to the arrangement of such a set of seat fittings on a floor rail of an aircraft. All of the seat fittings of the set are arranged in the longitudinal direction behind one another on a single floor rail. The floor rail comprises two parallel lips which are provided at spacings of in each case 1 inch with recesses for the passage of the holding bodies. The seat fittings are thus connected to the floor rail into which in the case of each seat fitting the web is arranged between the lips, the pin points upwards, the holding bodies engage behind the lip and the holding bodies are arranged centrally between two recesses adjacent to one another in the longitudinal direction.

The seat fittings of the set are preferably arranged so that the pins of two seat fittings adjacent to one another in the longitudinal direction have in each case the same spacings. This equidistant arrangement is preferably also satisfied for a multiplicity of sets which are arranged behind one another on the floor rail. If the set comprises a seat fitting pair, both seat fittings of the pair preferably have an opposite orientation on the floor rail. If the set comprises a multiplicity of seat fitting pairs, this preferably also applies to the other seat fitting pairs.

BRIEF DESCRIPTION OF THE DRAWINGS

The invention will be explained below with reference to the drawings on the basis of exemplary embodiments. In the drawings:

FIG. 5A shows a seat fitting with a ½ inch offset in a top view;

FIG. 5B shows a seat fitting with a ⅓ inch offset in a top view;

FIG. 5C shows a seat fitting with a ¼ inch offset in a top view;

FIG. 5D shows a seat fitting with a ⅕ inch offset in a top view;

FIG. 6 shows an arrangement of seat fittings on a floor rail with an equidistant 0.5 inch graduation;

FIG. 7 shows an arrangement of seat fittings on a floor rail with an equidistant ⅓ inch graduation;

DETAILED DESCRIPTION

Figure 1:
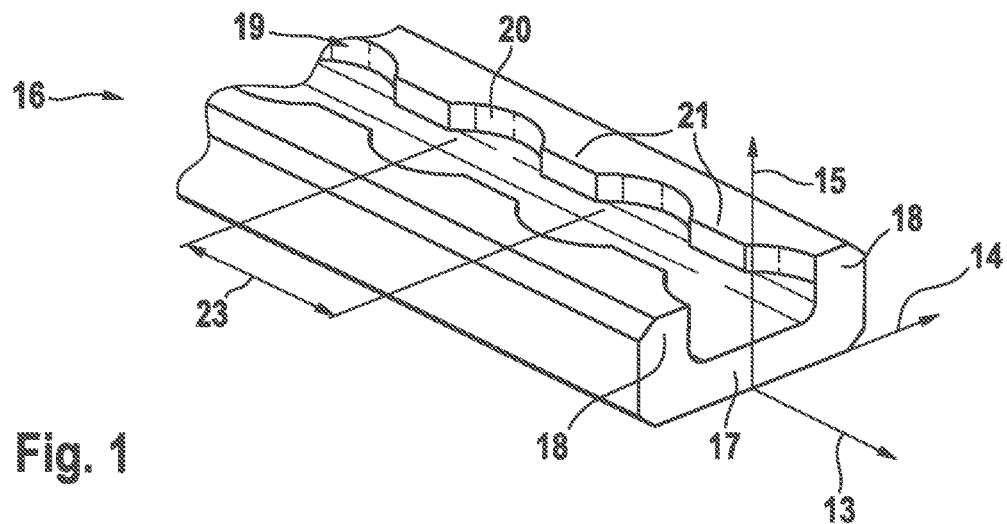
FIG. 1 shows a standard floor rail of an aircraft in a three-dimensional lateral view.
Figure 2:
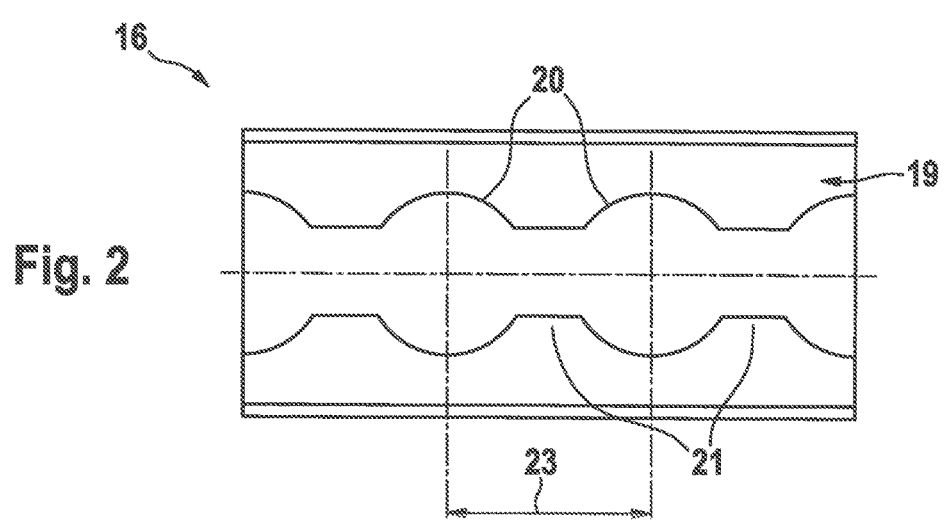
FIG. 2 shows the standard floor rail according to FIG. 1 in a view from above.

FIGS. 1 and 2 schematically show a three-dimensional view and a top view of a standardized floor rail. Three arrows are added in FIG. 1, these arrows indicating longitudinal direction 13, transverse direction 14 and vertical direction 15. Floor rail 16 has a floor surface 17 which is bounded in the transverse direction by two lateral surfaces 18. A projecting edge 19 which points inwards is arranged at the upper end of lateral surfaces 18. Edge 19 is provided with recesses 20. Spacing 23 in the longitudinal direction between the center points of two adjacent recesses 20 is 1 inch. The parts of edge 19 remaining between recesses 20 are referred to as lips 21. The spacing in the longitudinal direction between the center points of two adjacent lips 21 is also 1 inch.

Figure 3:
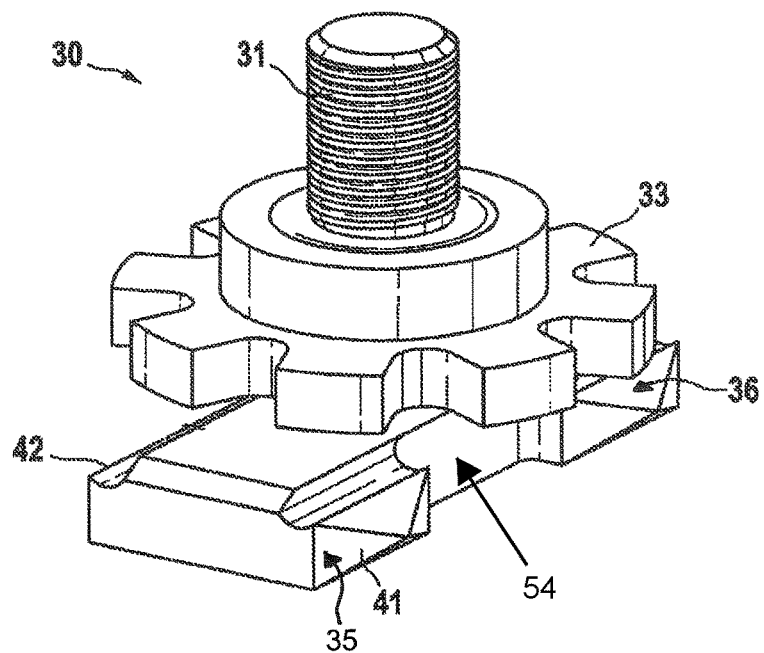
FIG. 3 shows a seat fitting in a three-dimensional lateral view.
Figure 4:
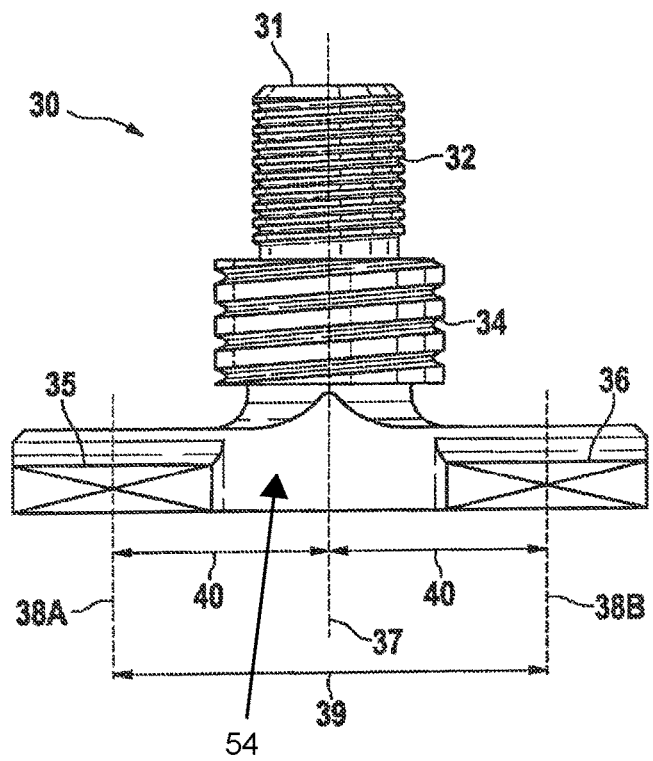
FIG. 4 shows the seat fitting according to FIG. 3 in a lateral view.

FIGS. 3 and 4 show a three-dimensional lateral view and a simple lateral view of a seat fitting 30. Seat fitting 30 comprises a pin 31 which extends in the vertical direction. The pin is provided with an external thread 32 which serves to attach a front leg of an aircraft seat. The seat fitting also comprises a tensioning element 34 in the form of an external thread 34 on the lower part of pin 31. A nut 33 which forms a counter-element to tensioning element 34 serves to tension the seat fitting in the vertical direction.

Two lateral holding bodies 35, 36 are arranged at the lower end of the pin. Holding bodies 35, 36 comprise in each case two lateral projections 41, 42 which project to the outside in the transverse direction in opposite directions with respect to the web 54 so that the outer contours of the first holding projection 35 and of the second holding projection 36 lie on an imaginary circular line. The diameter of the web 54 in the transverse direction can lie between 40% and 60% of the diameter of the holding bodies 35, 36. Two dashed lines 38A and 38A are plotted in FIG. 4, wherein these lines run through the center points of holding bodies 35, 36. Spacing 39 in the longitudinal direction between holding bodies 35, 36 is 1 inch. Holding bodies 35, 36 have, as seen from above, a circular contour which is adapted to recesses 20 in rail 16 (see also FIGS. 5A to 5D). Seat fitting 30 can thus be placed on a rail according to FIGS. 1 and 2 by virtue of the fact that holding bodies 35, 36 are inserted into recesses 20 of rail 16 in the vertical direction. Seat fitting 30 can subsequently be displaced in the longitudinal direction relative to floor rail 16 until holding bodies 35, 36 are located in a fixing position below lips 21. In the fixing position, nut 33 can be rotated about a vertical axis so that tensioning element and holding body tension lips 21 between them as a result of the thread transmission.

A dashed line 37 is furthermore plotted in FIG. 4, which line runs through the center point of pin 31. Spacing 40 in the longitudinal direction between pin 31 and holding bodies 35, 36 is ½ inch. The longitudinal position of pin 31 shown by line 37 is thus displaced relative to the positions of holding bodies 35, 36 by a ½ inch offset.

FIGS. 5A to 5D show seat fittings in a top view. The seat fitting of FIGS. 3 and 4 with a ½ inch offset 40 is shown in FIG. 5A. FIG. 5B shows a seat fitting with a ⅓ inch offset 40B, FIG. 5C shows a seat fitting with a ¼ inch offset 40C and FIG. 5D shows a seat fitting with a ⅕ inch offset 40D.

As a result of the mirror-symmetrical arrangement of holding bodies 35, 36, the seat fittings of FIGS. 5B to 5D can also be used as seat fittings with a ⅔, ¾ or ⅘ inch offset after rotation of the seat fittings about a vertical axis by 180°.

Figure 9:
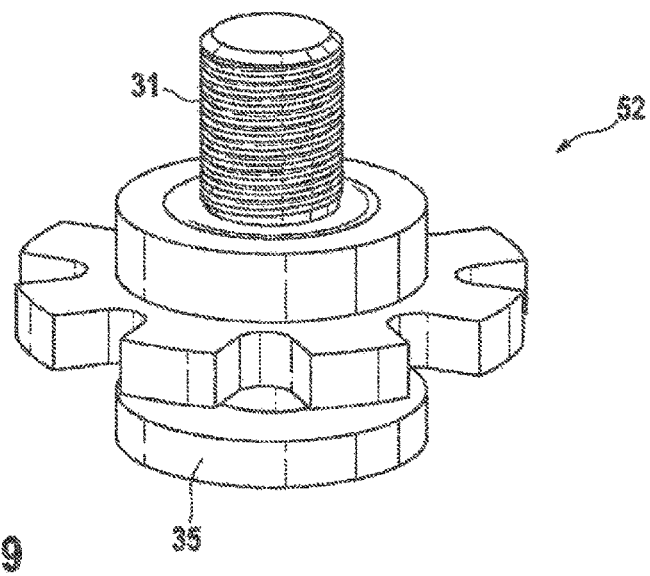
FIG. 9 shows a standard seat fitting as part of a set of seat fittings.

FIG. 6 schematically shows the arrangement of a set of seat fittings on a floor rail 50. Floor rail 50 is only represented as a line, fixing positions 51 in floor rail 50 are represented as dashes. Recesses arranged between the fixing positions are not shown. Fixing positions 51 are arranged at a spacing of an inch on floor rail 50. A first seat fitting 30 is arranged on the left-hand side of floor rail 50, wherein the holding bodies of seat fitting 30 are attached to two fixing positions. Pin 31 of seat fitting 30 has a ½ inch offset with respect to the fixing position. A standard seat fitting 52 is arranged further to the right on floor rail 50, which seat fitting 52 has a 0 inch offset. A standard seat fitting 52 in the case of which pin 31 is arranged with an offset of 0 inches concentrically with respect to holding body 35 is shown in FIG. 9. Further seat fittings 30 and 52 are arranged to the right next to seat fitting 52. This enables an equidistant arrangement of a multiplicity of aircraft seats with a 0.5 inch graduation.

FIG. 7 shows a further floor rail 50 on which a set of seat fittings is arranged. Seat fittings 30B, 52 with a ⅓ inch offset, with a ⅔ inch offset and with a 0 inch offset are located in different fixing positions 51. The arrangement leads to a spacing of 3⅔ inch between pins 31B, 53 of the seat fittings. This enables an equidistant arrangement of a multiplicity of aircraft seats with a 0.5 inch graduation.

Figure 8:
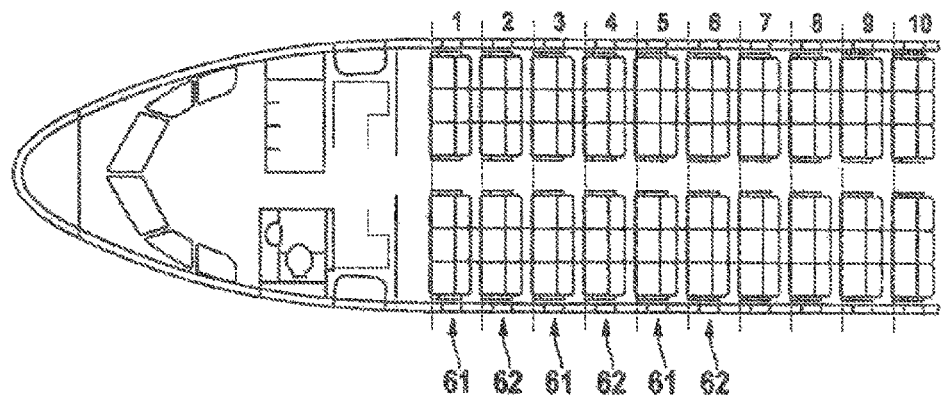
FIG. 8 shows a schematic representation of an arrangement of aircraft seats.

A schematic representation of an arrangement of aircraft seats is shown in FIG. 8. In each case three aircraft seats are combined to form a unit 61, 62 which is attached via two front legs and two back legs to the floor rail of the aircraft. A set of seat fittings, which set comprises a standard seat fitting with 0 inch offset and a seat fitting with 0.5 inch offset, serves to attach the front legs. In order to be able to connect the front legs of two units 61, 62 arranged behind one another to the floor rail, two such sets of seat fittings are required. Further seat fittings are additionally required for attaching the back legs, which are not discussed in greater detail here. Both front legs of unit 61 are fastened standard seat fittings of the two sets. Both front legs of unit 62 are attached with both seat fittings with 0.5 inch offset of both sets. Corresponding sets of seat fittings are used for rows of seats 61, 62 arranged in each case therebehind. An equidistant arrangement of a multiplicity of aircraft seats behind one another is produced, wherein the distances have a 0.5-inch graduation.

The invention claimed is:

1. A seat fitting for connecting an aircraft seat to an aircraft floor rail having a longitudinal direction comprising a vertically oriented pin, a web connected to the pin and a first holding body which projects in a lateral direction with respect to the web and which is configured in order to engage behind a lip of the floor rail, and a tensioning element in order to tension the holding body in the vertical direction against the lip of the floor rail, characterized in that the seat fitting has a second holding body projecting in the lateral direction and having a spacing of an inch from the first holding body in the longitudinal direction, and that the pin is arranged in the longitudinal direction at an offset distance relative to the first holding body and the second holding body such that the longitudinal distance between the pin and the first holding body is not the same as the longitudinal distance between the pin and the second holding body, wherein the pin is integrally fixed to the first holding body and second holding body.

2. The seat fitting as claimed in claim 1, characterized in that the holding bodies have in each case a first lateral holding projection and a second lateral holding projection which project in opposite directions with respect to the web, and that the first and second holding projection have outer contours and the outer contours of the first holding projection and of the second holding projection lie on an imaginary circular line.

3. The seat fitting as claimed in claim 1, characterized in that the web has a web diameter and the holding bodies each has a diameter and, in a transverse direction, the web diameter is between 40% and 60% of the diameter of the holding body.

4. A set of seat fittings, comprising:
a seat fitting pair with two seat fittings as claimed in claim 1 wherein the pin has an offset greater than 0 inches and less than 0.5 inches.

5. The set as claimed in claim 4, characterized in that the offset of the two seat fittings is 0.25 inches.

6. The set as claimed in claim 4, characterized in that the offset of the two seat fittings is 1/n inches, where n is an integer greater than 2.

7. The set as claimed in claim 4, comprising:
a standard seat fitting with a vertical pin and a holding body, wherein the pin is arranged with a 0 inch offset in the longitudinal direction with respect to the holding body.

8. A set of seat fittings, comprising:
a standard seat fitting with a vertical pin and a holding body, wherein the pin is arranged with an offset of 0 inches in the longitudinal direction with respect to the holding body;
a seat fitting pair with two seat fittings as claimed in claim 1 wherein the pin is arranged with an offset of ⅓ inches.

9. A set of seat fittings, comprising:
a standard seat fitting with a vertical pin and a holding body, wherein the pin is arranged with a 0 inch offset in the longitudinal direction with respect to the holding body;
a seat fitting as claimed in claim 1, wherein the pin is arranged with an offset of 0.5 inches.

10. The set of seat fittings as claimed in claim 9, comprising:
two seat fittings as claimed in claim 1 wherein the pin is arranged with an offset of 0.25 inches.

11. An arrangement of a set of seat fittings as claimed in claim 4 on a floor rail, wherein the floor rail has two parallel lips which are provided at spacings of 1 inch with recesses for a passage of the holding bodies, wherein the seat fittings are connected to the floor rail so that for each seat fitting, the web is arranged between the lips, the pin points upwards, the holding bodies engage behind the lip and the holding bodies are arranged centrally between two recesses adjacent to one another in the longitudinal direction.

12. The arrangement as claimed in claim 11, characterized in that each of the pins of two seat fittings, which are adjacent to one another in the longitudinal direction, have equidistant spacings.

13. The arrangement as claimed in claim 12, characterized in that two seat fittings of a seat fitting pair have an opposite orientation.

14. The arrangement as claimed in claim 13, characterized in that the set comprises a multiplicity of pairs of identical seat fittings and that all the pairs of the seat fittings have an opposite orientation.

15. The seat fitting as claimed in claim 2, characterized in that the web has a web diameter and the holding bodies each has a diameter and, in a transverse direction, the web diameter is between 40% and 60% of the diameter of the holding body.

16. The set as claimed in claim 5, comprising:
a standard seat fitting with a vertical pin and a holding body, wherein the pin is arranged with a 0 inch offset in the longitudinal direction with respect to the holding body.

17. The set as claimed in claim 6, comprising:
a standard seat fitting with a vertical pin and a holding body, wherein the pin is arranged with a 0 inch offset in the longitudinal direction with respect to the holding body.

18. An arrangement of a set of seat fittings as claimed in claim 5 on a floor rail, wherein the floor rail has two parallel lips which are provided at spacings of 1 inch with recesses for a passage of the holding bodies, wherein the seat fittings are connected to the floor rail so that for each seat fitting, the web is arranged between the lips, the pin points upwards, the holding bodies engage behind the lip and the holding bodies are arranged centrally between two recesses adjacent to one another in the longitudinal direction.

19. An arrangement of a set of seat fittings as claimed in claim 6 on a floor rail, wherein the floor rail has two parallel lips which are provided at spacings of 1 inch with recesses for a passage of the holding bodies, wherein the seat fittings are connected to the floor rail so that for each seat fitting, the web is arranged between the lips, the pin points upwards, the holding bodies engage behind the lip and the holding bodies are arranged centrally between two recesses adjacent to one another in the longitudinal direction.

20. An arrangement of a set of seat fittings as claimed in claim 7 on a floor rail, wherein the floor rail has two parallel lips which are provided at spacings of 1 inch with recesses for a passage of the holding bodies, wherein the seat fittings are connected to the floor rail so that for each seat fitting, the web is arranged between the lips, the pin points upwards, the holding bodies engage behind the lip and the holding bodies are arranged centrally between two recesses adjacent to one another in the longitudinal direction.

* * * * *